Figure 1:
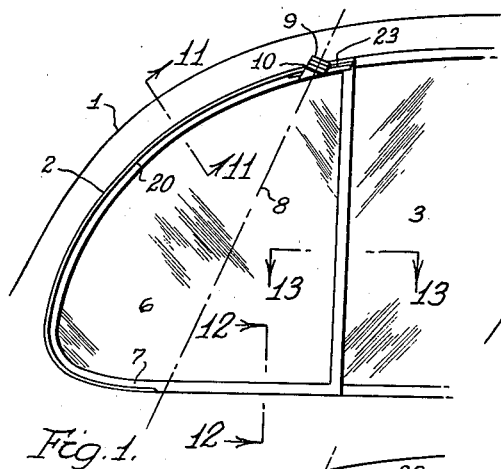

Sept. 8, 1942.  A. E. WILSHUSEN  2,295,277
VENTILATOR WINDOW
Filed April 12, 1939  2 Sheets-Sheet 1

INVENTOR.
August E. Wilshusen
BY
Windsor Davis
ATTORNEY.

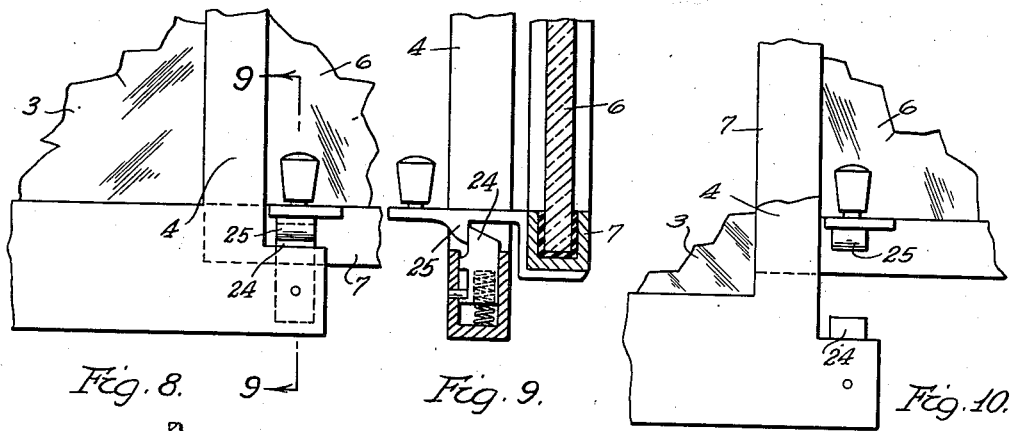

Patented Sept. 8, 1942

2,295,277

UNITED STATES PATENT OFFICE 2,295,277

VENTILATOR WINDOW

August E. Wilshusen, Detroit, Mich.

Application April 12, 1939, Serial No. 267,463

1 Claim. (Cl. 296—44)

This invention relates to composite closures for the window openings of automobiles and has for its object to provide an angularly adjustable ventilator panel in combination with a vertically slidable window whose forward edge is spaced from the forward end of the window opening, said ventilator being adapted in one position to complement the window in closing the opening, adapted in another position to deflect outside air and to cause circulation of air outwardly from the automobile body through the window opening, and adapted in another position to deflect outside air into the automobile body.

In mounting a ventilator panel in a window opening the usual practice is to dispose the axis of swinging movement forwardly of the panel, so that the major portion swings outwardly rather than inwardly. The main reason for such an arrangement is to provide clearance between the inwardly projecting end of the panel and the steering wheel when the panel is swung to its open position. Such an arrangement of the axis disposes an excessive length of panel outwardly of the automobile and in the path of the oncoming air stream, resulting in air noises and undesirably high air pressures at high speeds, and also in some cases does not blend with the general appearance or body design. This invention has as an object to provide a mounting for the panel which enables disposition of the axis toward the rear of the panel, as viewed in its closed position, either to provide equal areas forwardly and rearwardly of the axis, or to provide a greater area in front of the axis than to the rear.

In this respect the panel mounting disposes the axis extending upwardly and rearwardly, and also extending obliquely through the panel. The upper pivot is spaced outwardly from the closed position plane of the panel and the lower pivot is spaced inwardly, with the result that the forward portion of the panel describes a cone and the rearward portion describes another cone. The result is that the forward end of the panel is displaced forwardly, away from the steering wheel and the rear portion is displaced rearwardly and upwardly to extend adjacent the rear upper corner formed by the window opening and the slidable window. Further, the panel is angularly disposed with respect to the direction of oncoming air, and thus reduces air noises.

Another object is to provide a ventilator adapted to cause outward or inward circulation of air through the window opening of a car body, without causing discomfort to the passengers by directly subjecting them to drafts. In this respect, outwardly circulated air is drawn from both the upper and forward regions of the automobile body, to avoid the formation of localized drafts, and inwardly circulated air is diffused transversely and upwardly of the body.

Another object is to provide means for supporting a ventilator to provide the characteristics above mentioned, said means being designed to enable assembly of the entire ventilator mechanism as a unit. To this end a frame is provided which supports the ventilator for swinging movement about an axis disposed at an angle to the plane of the window opening, when viewed in side elevation, and also when viewed in front elevation. As viewed in side elevation, the axis inclines upwardly and rearwardly, and when viewed in front elevation inclines outwardly and upwardly. The upper pivot is disposed at the outside of the window frame and the lower pivot is disposed at the inside of the window frame, with the result that the axis of swinging movement extends obliquely through the glass of the ventilator. This arrangement has an important advantage in that it enables assembly of the ventilator on a garnish molding, so that assembly of the ventilator is completed by attachment of the garnish molding to the body.

Another object is to provide means for locking the ventilator in a closed position to prevent access to the automobile, said locking means being releasable by lowering the vertically slidable window.

Another object is to provide a ventilator having effective sealing means for preventing drafts and also to prevent water seepage in the presence of driving rain. More specifically, the object is to design a ventilator and supporting means therefor which enables the use of soft rubber sealing means having a cross sectional shape such that it embraces and retains itself upon the frame-like ventilator support in sealing contact with the ventilator. In this respect, the frame-like support for the ventilator is of angle sections, the rubber sealing means is formed as a strip, and the strip is wrapped about the angle section. This arrangement provides an effective seal without the necessity of molding the rubber to the shape of the ventilator, and without the use of fastening elements or adhesives.

Another object is to provide a ventilator having a rain deflector at the upper trailing corner adapted to deflect rain water outwardly and away from the window opening.

Another object is to provide a hinge member for pivotally supporting a ventilator and embodying friction means for holding the ventilator in various positions of adjustment.

Figure 3:
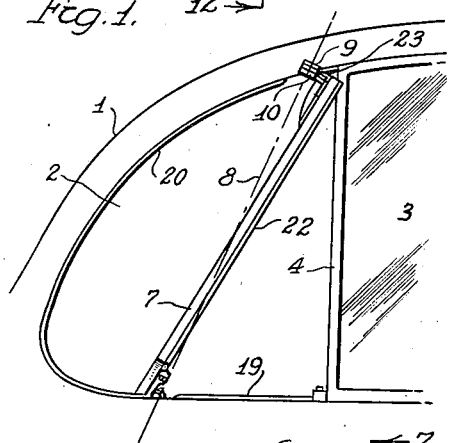
Figure 4:
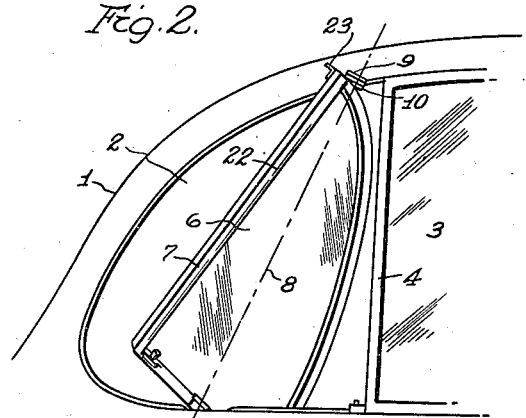
Figure 5:
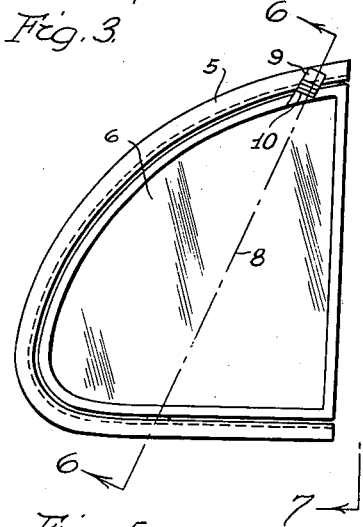
Figure 6:
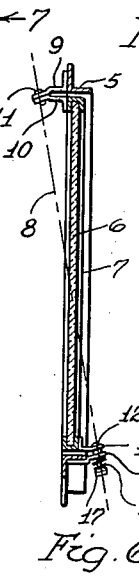
Figure 7:
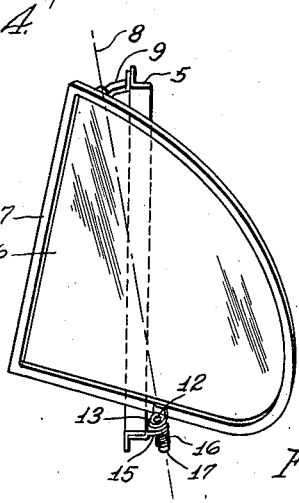

Other objects and advantages will become more fully apparent as reference is had to the accompanying drawings wherein my invention is illustrated, and in which:

Figs. 1 to 4 are fragmental side elevations of an automobile, each view illustrating a different position of the ventilator, Fig. 5 is a side elevation of the ventilator mounted in its supporting frame, the sealing means being omitted, Figs. 6 and 7 are sections taken respectively on line 6—6 and 7—7 of Fig. 5, Fig. 8 is a fragmental inside elevation illustrating the ventilator latching means, Fig. 9 is a section taken on the line 9—9 of Fig. 8, Fig. 10 is a view similar to Fig. 8, illustrating release of the ventilator latching means, Figs. 11, 12 and 13 are sections taken respectively on lines 11—11, 12—12 and 13—13 of Fig. 1, Fig. 14 is a detail section, illustrating friction means holding the ventilator in positions of adjustment, Fig. 15 is a fragmental perspective illustrating the rain deflector, Fig. 16 is a section illustrating a modified sealing means, Fig. 17 is an elevation of a modified ventilator frame, and Fig. 18 is a section illustrating the ventilator mounted in unitary arrangement with a garnish molding.

More particularly, 1 designates a fragment of an automobile body having a window opening 2. Slidable vertically in the opening 2 is a window 3 whose forward edge 4 is spaced a substantial distance from the front edge of the window opening. The window 3 is mounted according to the usual practice, and may be imagined as having the usual lift mechanism by means of which it may be manually raised or lowered.

Mounted in the window opening 2 by suitable securing means such as bolts or screws (not shown) is an angle iron 5 which is bent to substantially C shape to conform to the shape of the forward portion of the window opening. A ventilator 6 is mounted in a metal frame 7 which is pivoted about an inclined axis designated by the line 8. The upper support for the ventilator comprises an outwardly extending bracket 9 secured to the angle iron 5 and connected to a bracket 10 on the ventilator frame 7 by a hinge pin 11. In line with the pin 11, and at the lower part of the frame 7, is a pin 12 which is fixed to a bracket 13 attached to and extending inwardly from the frame 7. A bearing member 14 on the pin 12 is rotatably received in an aperture in a bracket 15 attached to the angle iron 5, and a spring 16 is retained on the pin 12 by a nut 17 and presses against the bracket 15 to frictionally oppose pivotal movement of the ventilator.

With the upper pivot disposed outwardly and the lower pivot disposed inwardly the axis 8 of swinging movement of the ventilator is so located that it extends obliquely through the ventilator, as may be seen in Fig. 6. The upper pivot is spaced a greater distance from the front of the opening than the lower pivot, with the result that the axis 8 inclines rearwardly and upwardly. This inclination of the axis 8 results in a ventilator movement providing improved ventilation. For example, with the ventilator positioned as in Fig. 2, air circulates outwardly of the forward part of the opening, and the air so circulated is drawn from both the front and top regions of the automobile body. In Fig. 3 the ventilator is in a mid position illustrative of its rearward-upward inclination. In Fig. 4 the ventilator is positioned to deflect air inwardly of the body, in which position it causes diffusion of the air so deflected over a large area within the body, the direction of the diffusion being transversely and upwardly.

To seal the ventilator thus mounted, a rubber strip is mounted on the angle iron 5, the strip being originally straight in the direction of its length and being shaped in cross section so that it embraces the C-shaped angle iron. More specifically, the strip is formed of angle section to fit the outside surfaces of the angle iron and has a flange 18 which engages one of the inside surfaces of the angle iron. Adjacent the inwardly swinging portion of the ventilator the rubber strip has a sealing flange 19 disposed at the outside edge thereof for contact by the outside edge of the ventilator frame 7, and for the portion of the ventilator frame which swings outwardly a sealing flange 20 is disposed at the inside of the strip for contact by the inside edge of the frame 7.

To seal the edge of the ventilator which is adjacent the edge 4 of the window 3, a rubber element 21 is retained in the channel frame 7 of the ventilator and has an external sealing portion 22. The sealing portion 22 contacts the edge 4 of the window when the ventilator is closed as shown in Fig. 7.

Figure 2:
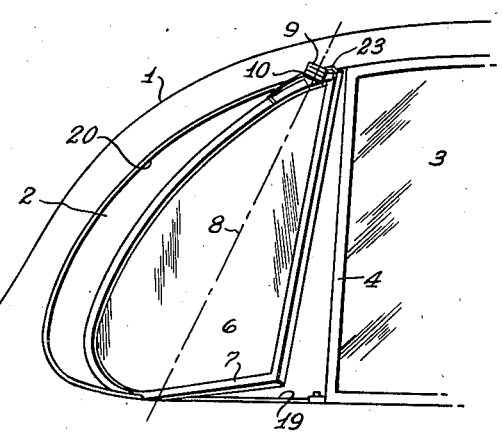

When the ventilator is in the open position shown in Fig. 2, there is a tendency for rain water collecting on the ventilator being blown through the upper rear portion of the window opening. To prevent this from happening a water deflector 23 is provided at the upper rear corner of the ventilator. The deflector comprises a bracket of angle section curved in the direction of its length to throw the water away from the window opening 2.

An important feature of the invention resides in the means for locking the ventilator in a closed position. This means comprises a spring pressed plunger 24 mounted on the forward edge of the window 3 and adapted to engage a bracket 25 which is fixed on the ventilator frame 7. When the window 3 is in the fully raised position shown in Figs. 8 and 9, and the ventilator is closed, the spring pressed plunger 24 engages the bracket 25 and retains the ventilator in its closed position. To release the ventilator, to permit opening movement thereof, the window 3 is lowered, as shown in Fig. 10, and thereby moves the plunger 24 out of engagement with the bracket 25.

As shown in Figs. 16 and 17, the ventilator frame 7a is three sided, in which case the ventilator has no frame portion in which a seal such as the one shown at 22 might be mounted. In this case, a similar sealing member 22a is mounted in the window frame 4a for contact with the ventilator 6a.

Figs. 5, 6 and 7 illustrate the mounting of the ventilator and its sealing means on a C shaped frame member in order that the ventilator and its supporting means may be separately assembled and mounted in the automobile as a unit. When assembled in the automobile the axis of swinging movement is so disposed that an equal area of glass is present on each side of the axis, as viewed in side elevation. The area in front of the axis is illustrated as slightly larger than that at the rear which is made possible because the arrangement of the axis causes the front end of the ventilator to swing forwardly, away from the steering wheel. The inward and outward disposition of the pivots in combination with the rearward and upward inclination provides greater clearance between the window reveals and the ventilator than is the case with a vertical or substantially vertical axis, making possible movement through substantially more than 90°, and also reduces air noises by avoiding positioning of the ventilator transverse to the direction of travel of the automobile.

Fig. 17 illustrates the ventilator unit assembled on the inside garnish molding of the window opening. In this case, the lower garnish molding 30 has a struck up portion 31 receiving the lower pivot 32, and a bracket 33 is secured to or formed integral with the upper portion of the molding to receive the upper pivot 34. The rubber sealing strip 35 is secured to the molding, as by rivets 36, and the ventilator may be assembled in the window opening by mounting the garnish molding in the usual manner.

What is claimed is:

The combination in a vehicle having a body with a window opening and a window slidable in said opening with its front edge spaced from the front of the opening, a panel pivoted in said opening and complementing said window in forming a composite closure for the window, a bracket on said panel, and a spring pressed plunger on said window adapted when the window is closed to engage said bracket to hold the panel closed.

AUGUST E. WILSHUSEN.